E. PACE.
NUT LOCK.
APPLICATION FILED MAR. 17, 1917.
1,293,180. Patented Feb. 4, 1919.
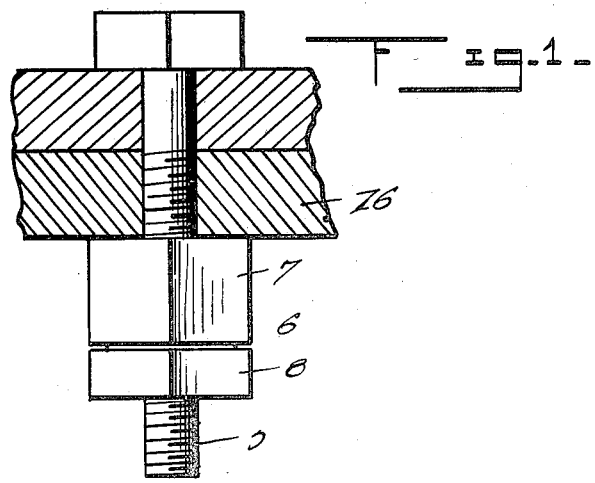
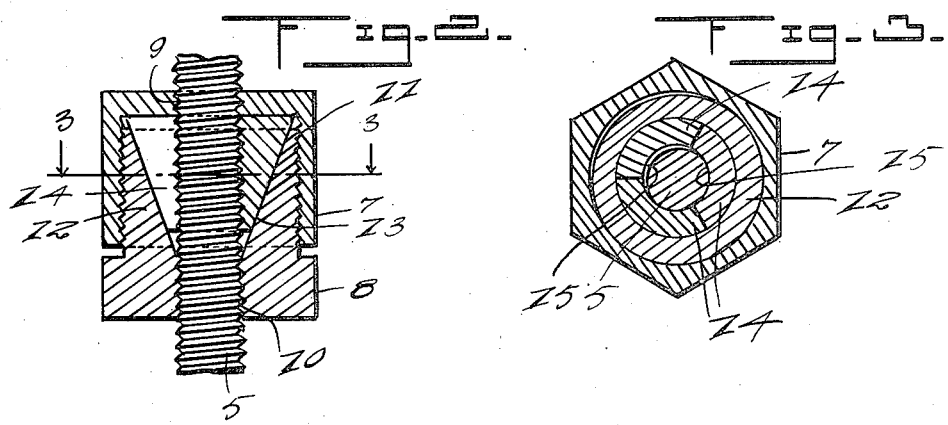
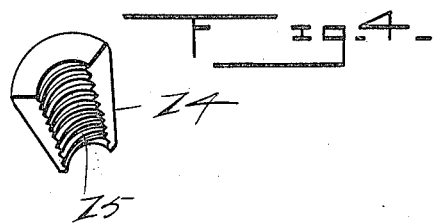
Inventor
E. Pace.

UNITED STATES PATENT OFFICE.

ERNEST PACE, OF WIRT, OKLAHOMA, ASSIGNOR OF ONE-HALF TO THOMAS LEA McFARLAND, OF WIRT, OKLAHOMA.

NUT-LOCK.

1,293,180.

Specification of Letters Patent. Patented Feb. 4, 1919.

Application filed March 17, 1917. Serial No. 155,519.

*To all whom it may concern:*

Be it known that I, ERNEST PACE, a citizen of the United States, residing at Wirt, in the county of Carter and State of Oklahoma, have invented certain new and useful Improvements in Nut-Locks; and I do hereby declare the following to be a full, clear, and exact description of the invention, such as will enable others skilled in the art to which it appertains to make and use the same.

This invention has for its object to provide an improved nut lock embodying a two-part nut, and a plurality of locking elements operable thereby to establish a friction lock between the nut and bolt.

Another object is the provision of a nut lock having an exceptionally wide range of adjustment permitting the nut to be locked at any point throughout the length of the threaded portion of the bolt.

With these and other objects in view, the invention consists in the novel construction, combination and arrangement of parts as will be hereinafter specifically described, claimed and illustrated in the accompanying drawing, in which:

Figure 1 represents a side elevation of the nut lock applied to an object, the latter being shown in section, Fig. 2 represents a fragmentary longitudinal sectional view through the nut lock, Fig. 3 represents a transverse sectional view at right angles to Fig. 2, taken on the line 3—3 of Fig. 2, and Fig. 4 represents a perspective view of one of the locking elements removed from the two-part nut.

Referring to the drawing in detail, wherein similar reference numerals indicate corresponding parts throughout the several views, the numeral 5 indicates the preferred type of bolt, having the usual external screw threads extending inwardly from one terminal thereof upon which the improved nut lock, designated generally by the numeral 6, is fitted.

The nut lock consists of inner and outer nut parts 7 and 8, respectively, provided with internally screw threaded bores 9 and 10, respectively, for coöperation with the threads of the bolt 5. The inner nut part 7 is of shell-like or hollow formation, having the internal recess 11, provided with internal screw threads fitting the externally screw threaded projection 12 of the outer part 8. The screw threads of the projection 12 are of the same pitch as the screw threads of the bolt, so that the nut parts may be readily moved with relation to each other, or together, upon the screw threads of the bolt.

The outer portions of the nut parts are of polygonal formation, so as to permit of the application of the jaws of a wrench thereto for convenience in adjusting the nut parts. The outer nut part 8 is formed in the end adjacent the inner nut part 7 with a substantially conical recess, 13, communicating with and forming a continuation of the internally screw threaded bore 10.

The surface of the recess or enlarged terminal of the bore is plane and slidably engages the outer surfaces of a series of locking elements, designated by the numerals 14. The locking elements 14 are in the shape of segments of a frustrated cone, and are formed with internal screw threads 15, fitting the screw threads of the bolt 5.

In use, the parts of the nut lock are assembled, as shown in Fig. 2, and the nut is advanced bodily against an object 16. When the inner nut part 7 has been thus jammed against the object 16 and its movement with relation thereto is stopped, the outer nut part 8 is turned to advance toward the object, thus causing the locking elements to move inwardly toward and firmly grip the screw threads of the bolt 5 and frictionally lock the parts of the nut lock against movement with relation thereto.

What I claim is:

1. A lock nut having telescoping members, the outer of which is threaded upon the inner to form a housing and the latter of which is provided with a conical cavity tapered in the direction of progressive movement of the former thereon, and tapered locking elements disposed in said cavity for terminal contact by the first named member.

2. A lock nut having telescoping members, the outer of which is threaded upon the inner to form a housing and the latter of which is provided with a conical cavity tapered in the direction of progressive movement of the former thereon, and a sectional conical locking member seated in said cavity with its base in the path of movement of the first named member relative to the second named member.

3. As an article of manufacture a lock nut comprising housing and locking members, the housing member comprising telescopically related elements of which the outer is threaded for progressive movement upon the inner and of which the inner member is provided with a conical seat closed at its base or larger end by the said outer element, and said locking member consisting of a plurality of tapered elements snugly fitted within said conical cavity with their bases exposed for contact by the seat closing portion of the outer housing element, said locking elements being interiorly threaded for engagement with bolt threads.

In testimony whereof I affix my signature in presence of two witnesses.

ERNEST PACE.

Witnesses:
E. B. Jaeger,
A. N. Aduon.